Nov. 4, 1924.  1,514,257
W. F. OESTERLE ET AL
WINDSHIELD
Filed Sept. 26, 1922
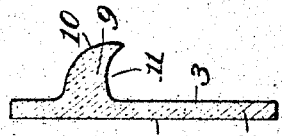
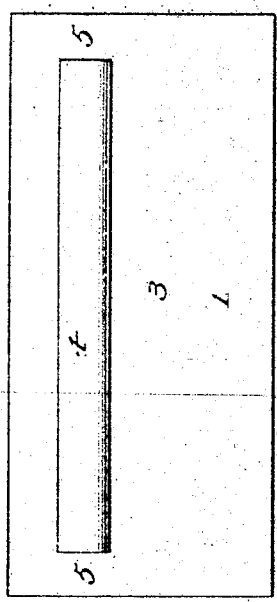
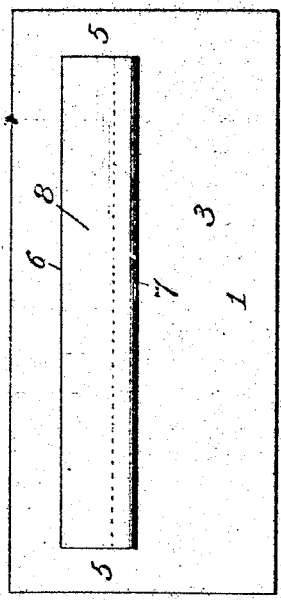
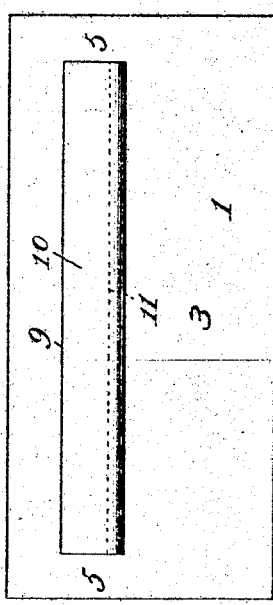

Patented Nov. 4, 1924.

1,514,257

UNITED STATES PATENT OFFICE.

WILLIAM F. OESTERLE AND EDGAR H. G. OESTERLE, OF PERU, ILLINOIS.

WINDSHIELD.

Application filed September 26, 1922. Serial No. 590,635.

*To all whom it may concern:*

Be it known that we, WILLIAM F. OESTERLE and EDGAR H. G. OESTERLE, citizens of the United States, residing at Peru, in the county of La Salle and State of Illinois, have invented certain new and useful Improvements in Windshields, of which the following is a specification, reference being had therein to the accompanying drawing.

Our invention relates to new and useful improvements in windshields or storm and rain shields and more particularly to a windshield adapted for automobiles or similar vehicles so constructed as to prevent the glare of the sun or of headlights of approaching vehicles from blinding the driver.

The principal object of the invention resides in constructing the windshield in a novel manner so not only will the glare of the sun or of the headlights of approaching vehicles being deflected from the line of vision of the driver of the vehicle but the shield itself will be strengthened.

Another object of the invention resides in forming the windshield with a transversely extending rib or projection having curved surfaces for directing the rays of light of the sun or the headlights of an approaching vehicle from the line of vision of the driver of the vehicle.

With the above and other objects in view which will appear as the description proceeds our invention consists of the novel details of construction and arrangement of parts described in the following specification and illustrated in the accompanying drawings, and while we illustrated and described the preferred embodiments of the invention as they now appear to us it will be understood that such changes might be made as will fall within the scope of the appended claims.

In the drawings:—

Fig. 1 is an elevation of the inner side of the shield.

Fig. 2 is a transverse vertical section.

Fig. 3 is an elevation of the inner face of a slightly modified form of shield.

Fig. 4 is a transverse vertical section of that form of shield illustrated in Fig. 3.

Fig. 5 is an elevation of the inner face of a still further modified form of shield, and Fig. 6 is a transverse vertical section of that form of shield illustrated in Fig. 5.

In the drawings 1 indicates the windshield of glass or other suitable transparent material, 2 indicates the outer face thereof and 3 the inner face or that face directed towards the driver of the vehicle. It is a well known fact that often the driver of an automobile or other vehicle is blinded by the rays of the sun or by the glare of the headlights of approaching vehicles. It is the object of our invention to prevent the rays of light from the sun or a vehicle from entering the line of vision of the driver and in carrying this out the windshield is provided on its inner face with a transversely extending curved rib or projection. In Figs. 1 and 2 I have shown this transversely extending rib or projection 4 as being semi-circular in cross section and terminating short of the ends of the windshield to leave the spaces 5. The rib or projection terminates short of the ends of the windshield so as to leave the spaces 5 to be received within the windshield frame or other support.

In Figs. 3 and 4 I have shown the rib or projection 6 as having a depending portion 7, the rib or projection 6 being curved as shown at 8 and the bottom of the extension 7 being convex in shape. In Figs. 5 and 6 the rib or projection is shown at 9 and in this form of the invention the upper surface is curved as shown at 10 while the under surface is concave as shown at 11. It will be understood that in the forms of the invention shown in Figs. 3, 4, 5, and 6 the rib or projection terminates short of the ends of the windshield, the same as it does in the construction shown in Figs. 1 and 2 to leave the spaces 5.

From the above it will be seen that the rib or projection may be of several different curvatures and while we have illustrated and described the three preferred forms as now suggested and appearing to us it will be understood that variations might be made in the specific shapes. The main idea of our invention is the formation of this transversely extending rib or projection with a curved surface which will take the opposing light and then bend or transfer the rays away from the driver's eyes and prevent the glare from entering the line of vision. This rib or projection is transparent the same as the windshield itself and therefore there is nothing to obstruct the view of the driver. The intensity of the sun rays or the rays of an approaching headlight are reduced and therefore accidents caused by the blinding of the driver of a vehicle will be overcome.

Not only does the rib or projection prevent the glare but will strengthen or reinforce the windshield and by having it extend substantially the width of the windshield all occupants of the car will be protected against the glare as well as the driver. By terminating the rib or projection short of the ends of the windshield the windshield may be accommodated in the frames or other supports now commonly in use. It will be understood that the rib or projection is so positioned upon the windshield as to be above the line of vision of the driver. While we have illustrated the invention as applied to a windshield it will be understood that it will be equally as well adapted for use in connection with storm or rain shields.

Having fully described our invention what we claim as new and desire to secure by Letters Patent is:

1. A windshield for vehicles having formed on its inner face a single transversely extending projection in the line of vision of the driver, the face of the projection towards the driver being rounded to transfer the rays from the line of vision of the driver.

2. A windshield for vehicles having formed on its inner face a single transversely extending protection in the line of vision of the driver, the face of the projection towards the driver being rounded to transfer the rays from the line of vision of the driver and the ends of the projection terminating short of the vertical edges of the windshield.

In testimony whereof we hereunto affix our signatures in the presence of two witnesses.

WILLIAM F. OESTERLE.
EDGAR H. G. OESTERLE.

Witnesses:
PAUL BRAUNS, JR.,
WILLIAM C. GOEBEL.